United States Patent
Kato

(10) Patent No.: US 12,099,361 B2
(45) Date of Patent: Sep. 24, 2024

(54) OUTPUT DEVICE, CONTROL METHOD, PROGRAM AND STORAGE MEDIUM FOR CONTROL OF A MOVING BODY BASED ON ROAD MARKING DETECTION ACCURACY

(71) Applicant: PIONEER CORPORATION, Tokyo (JP)

(72) Inventor: Masahiro Kato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 47 days.

(21) Appl. No.: 16/499,579

(22) PCT Filed: Mar. 5, 2018

(86) PCT No.: PCT/JP2018/008346
§ 371 (c)(1),
(2) Date: Sep. 30, 2019

(87) PCT Pub. No.: WO2018/180247
PCT Pub. Date: Oct. 4, 2018

(65) Prior Publication Data
US 2020/0026297 A1    Jan. 23, 2020

(30) Foreign Application Priority Data
Mar. 28, 2017    (JP) .................. 2017-062441

(51) Int. Cl.
*G01C 21/34* (2006.01)
*B60W 30/18* (2012.01)
(Continued)

(52) U.S. Cl.
CPC ..... *G05D 1/0212* (2013.01); *B60W 30/18163* (2013.01); *B60W 60/001* (2020.02);
(Continued)

(58) Field of Classification Search
CPC . B60W 60/005–0061; B60W 2420/52; B60W 2420/62; B60W 2552/53;
(Continued)

(56) References Cited

U.S. PATENT DOCUMENTS 6,157,342 A * 12/2000 Okude ............... G01C 21/3635
                                                  342/357.3
9,719,801 B1 * 8/2017 Ferguson ............. G01S 17/931
(Continued)

FOREIGN PATENT DOCUMENTS

DE    102012206903 A1 * 10/2013    ........... B60W 30/12
EP        3016086 A1    5/2016
(Continued)

OTHER PUBLICATIONS

Hirasawa—English Description of JP-3575352-B2 via Espacenet Patent Translate, retrieved Sep. 13, 2023. (Year: 2023).*
(Continued)

*Primary Examiner* — Rami Khatib
*Assistant Examiner* — Paul Allen
(74) *Attorney, Agent, or Firm* — PROCOPIO, CORY, HARGREAVES & SAVITCH LLP

(57) ABSTRACT

An onboard device 1 is provided with an own vehicle position estimation unit 17 and an autonomous driving control unit 18. The own vehicle position estimation unit 17 estimates the own vehicle position by collating a detection result of a road marking by a lidar 2 with map DB 10. The autonomous driving control unit 18 acquires, from the map DB 10, the road marking information including detection accuracy information Idet indicative of the accuracy of the collation with respect to each road marking. On the basis of the detection accuracy information Idet, the autonomous driving control unit 18 outputs, to an electronic control device or an information output unit 16 of the vehicle,
(Continued)

information for controlling the vehicle so that the accuracy of the collation is equal to or larger than a predetermined value.

11 Claims, 10 Drawing Sheets

(51) Int. Cl.
  *B60W 60/00* (2020.01)
  *G01C 21/36* (2006.01)
  *G05D 1/00* (2024.01)
  *G08G 1/09* (2006.01)
(52) U.S. Cl.
  CPC ..... *G01C 21/3453* (2013.01); *G01C 21/3602* (2013.01); *G05D 1/0231* (2013.01); *B60W 2420/408* (2024.01); *B60W 2552/53* (2020.02); *G08G 1/09* (2013.01)
(58) Field of Classification Search
  CPC ............ B60W 30/18163; B60W 30/12; G05D 1/0088; G01C 21/34–3492
  USPC ....................................................... 701/23–28
  See application file for complete search history.

(56) References Cited

U.S. PATENT DOCUMENTS

| | | | |
|---|---|---|---|
| 2011/0241862 A1* | 10/2011 | Debouk ............ B60W 60/0018 340/439 |
| 2012/0053755 A1 | 3/2012 | Takagi | |
| 2015/0260530 A1* | 9/2015 | Stenborg ................ G01C 21/30 701/461 |
| 2015/0293216 A1* | 10/2015 | O'Dea .................... G01S 13/87 701/23 |
| 2016/0101812 A1 | 4/2016 | Niki | |
| 2016/0117923 A1 | 4/2016 | Dannenbring | |
| 2016/0146618 A1* | 5/2016 | Caveney ........... B60W 60/0053 701/25 |
| 2016/0327947 A1 | 11/2016 | Ishikawa et al. | |
| 2017/0010613 A1* | 1/2017 | Fukumoto ........ G08G 1/096827 |
| 2017/0069206 A1 | 3/2017 | Dannenbring | |
| 2017/0227971 A1* | 8/2017 | Shimotani .......... G01C 21/3461 |
| 2017/0240183 A1* | 8/2017 | Suzuki ................. G05D 1/0088 |
| 2017/0322040 A1* | 11/2017 | Stephens .............. G08G 1/0112 |
| 2017/0356748 A1* | 12/2017 | Iagnemma ............. G01C 21/34 |
| 2018/0022347 A1* | 1/2018 | Myers ..................... G01S 17/86 701/26 |
| 2018/0023966 A1 | 1/2018 | Iwai et al. | |
| 2018/0066960 A1* | 3/2018 | Tateishi ................. G01C 21/30 |
| 2018/0067494 A1* | 3/2018 | Schiffmann ........... B60W 30/12 |
| 2018/0151066 A1 | 5/2018 | Oba | |
| 2018/0165960 A1* | 6/2018 | Seo ...................... G01C 21/005 |
| 2018/0203455 A1* | 7/2018 | Cronin .............. B60W 60/0011 |
| 2018/0224295 A1 | 8/2018 | Nakajima | |
| 2018/0237018 A1 | 8/2018 | Goto et al. | |
| 2018/0267172 A1* | 9/2018 | Oh ......................... G01S 17/931 |
| 2018/0273031 A1* | 9/2018 | Fujita ..................... G01C 21/30 |
| 2019/0263405 A1* | 8/2019 | Schack ............. G01C 21/3658 |
| 2019/0351901 A1* | 11/2019 | Hori ........................... G06T 7/60 |

FOREIGN PATENT DOCUMENTS

| | | |
|---|---|---|
| JP | 3575352 B2 * | 10/2004 |
| JP | 2009180631 A | 8/2009 |
| JP | 2012048642 A | 3/2012 |
| JP | 2012-117944 A | 6/2012 |
| JP | 2013-083576 A | 5/2013 |
| JP | 2015-141611 A | 8/2015 |
| JP | 2016078490 A | 5/2016 |
| JP | 2017-041070 A | 2/2017 |
| WO | 2016/035199 A1 | 3/2016 |
| WO | 2016139748 A1 | 9/2016 |
| WO | 2016159171 A1 | 10/2016 |
| WO | 2017017760 A1 | 2/2017 |

OTHER PUBLICATIONS

Schneider—English Description of DE-102012206903-A1 via Espacenet Patent Translate, retrieved Sep. 13, 2023. (Year: 2023).*
International Search Report for related International Application No. PCT/JP2018/008346, mailed on May 1, 2018; 2 pages.
European Search Report for European App. No. 18774558.3 dated Dec. 16, 2020; 8 pages.

* cited by examiner

OUTPUT DEVICE, CONTROL METHOD, PROGRAM AND STORAGE MEDIUM FOR CONTROL OF A MOVING BODY BASED ON ROAD MARKING DETECTION ACCURACY

CROSS-REFERENCE TO RELATED APPLICATIONS

This application is a U.S. National Stage entry of PCT Application No: PCT/JP2018/008346 filed Mar. 5, 2018, which claims priority to Japanese Patent Application No. 2017-062441 filed Mar. 28, 2017, the contents of which are incorporated herein by reference.

TECHNICAL FIELD

The present invention relates to a technique of controlling a vehicle.

BACKGROUND TECHNIQUE

There is proposed a method of performing an autonomous driving by accurately estimating the own vehicle position based on the detection result of features in surroundings of the vehicle by use of a radar or a camera. Patent Reference 1 discloses method of determining the degree of deterioration of a compartment line provided on the current road based on the output of external sensor(s) and controlling the vehicle to move on a lane, if any, on which a compartment line can be more accurately detected than on the current lane.

PRIOR ART REFERENCES

Patent References

Patent Reference 1: Japanese Patent Application Laid-Open under No. 2015-141611

SUMMARY OF THE INVENTION

Problem to be Solved by the Invention

According to such a mode that the state of each compartment line is measured by external sensor(s) and monitored, there are cases that the state of compartment lines on other lanes cannot be correctly determined under such a condition that there are other vehicles in the vicinity. Furthermore, according to the above mode, it is also impossible to recognize the state of compartment lines existing out of the measurement range by the external sensor(s).

The above is an example of issues to be solved by the present invention. It is an object of the present invention to provide an output device capable of suitably controlling the vehicle based on information relating to road markings.

Means for Solving the Problem

An invention described in claims is an output device including: a collation unit configured to collate a detection result of a road marking by a detection device with map information; a first acquisition unit configured to acquire accuracy information indicating an accuracy of the collation with respect to each road marking; and an output unit configured to output control information for controlling a moving body so that the accuracy of the collation is equal to or larger than a predetermined value.

Another invention described in claims is a control method executed by an output device including: a collation process to collate a detection result of a road marking by a detection device with map information; a first acquisition process to acquire accuracy information indicating an accuracy of the collation with respect to each road marking; and an output process to output control information for controlling a moving body so that the accuracy of the collation is equal to or larger than a predetermined value.

Still another invention described in claims is a program executed by a computer, the program causing the computer to function as: a collation unit configured to collate a detection result of a road marking by a detection device with map information; a first acquisition unit configured to acquire accuracy information indicating an accuracy of the collation with respect to each road marking; and an output unit configured to output control information for controlling a moving body so that the accuracy of the collation is equal to or larger than a predetermined value.

DETAILED DESCRIPTION OF THE PREFERRED EMBODIMENTS

Figure 1:
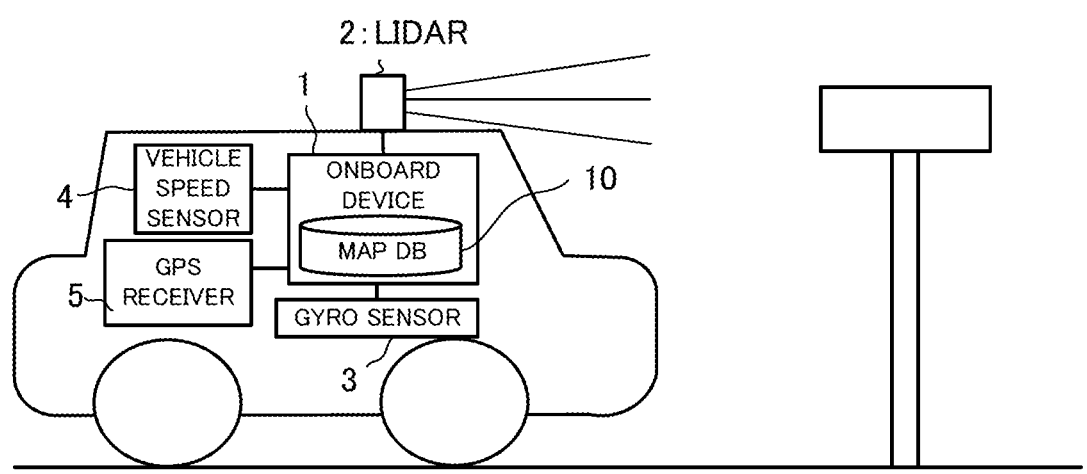
FIG. 1 is a diagram illustrating a schematic configuration of a driving support system.

According to a preferable embodiment of the present invention, there is provided an output device including: a collation unit configured to collate a detection result of a road marking by a detection device with map information; a first acquisition unit configured to acquire accuracy information indicating an accuracy of the collation with respect to each road marking; and an output unit configured to output control information for controlling a moving body so that the accuracy of the collation is equal to or larger than a predetermined value. According to this mode, by acquiring the accuracy information with respect to each road marking relating to the collation of the detection result of the road marking by the detection device and the map information, the output device can suitably control the moving body so that the above collation can be performed with a degree of accuracy equal to or higher than the predetermined value.

In one mode of the above output device, the output unit identifies, from road marking(s) provided at a route of the moving body, a low accuracy road marking that the accuracy of the collation is lower than the predetermined value and the output unit outputs the control information for controlling the moving body so that the moving body gets away from the low accuracy road marking. According to this mode, the output device can suitably move the vehicle so as not to detect such a road marking that the accuracy of the collation is lower than the predetermined value.

In another mode of the above output device, the output unit searches for a route to a destination based on the accuracy information and outputs information relating to the searched route as the control information. According to this mode, the output device can determine the route to travel in consideration of the accuracy of the collation of the detection result of the road marking and the map information.

In still another mode of the above output device, the output unit outputs the control information for displaying, on a display unit as a recommended route, information relating to a route on which the collation is performed with an accuracy equal to or larger than the predetermined value. According to this mode, the output device can suitably present, to the user as a recommended route, such a route on which the collation of the detection result of the road marking with the map information can be performed with a degree of accuracy equal to or higher than the predetermined value.

In still another mode of the above output device, the output unit identifies, from road marking(s) provided on a route of the moving body, a high accuracy road marking that the accuracy of the collation is equal to or higher than the predetermined value wherein the output unit outputs the control information for controlling the moving body so as for the moving body to approach the high accuracy road marking. According to this mode, in order to achieve the collation with a higher accuracy, the output device can suitably move the vehicle so that the vehicle approaches the road marking that the accuracy of the collation is equal to or higher than the predetermined value.

In still another mode of the above output device, the output device further includes: a detection unit configured to detect, by comparing errors of the estimated position in a first direction and in a second direction with respect to a travelling direction of the moving body with a threshold, a direction in which the error of the estimated position is larger than the threshold; and a second acquisition unit configured to acquire suitability information indicating a degree of suitability of each of the road marking(s) in a case that each of the road marking(s) is used as a reference of position estimation in the direction detected by the detection unit, wherein the output unit identifies the high accuracy road marking based on the accuracy information and the suitability information. According to this mode, the output device can suitably move the vehicle so that the vehicle approaches such a road marking having a high degree of suitability as a reference of the position estimation in the direction in which the error of the estimated position is determined to be larger than a threshold.

In still another mode of the above output device, the output device further includes a position estimation unit configured to estimate a position of the moving body based on a result of the collation. According to this mode, the output device can control the vehicle so as to maintain the accuracy of the estimated position in a predetermined level by using the accuracy information regarding the collation.

In still another mode of the above output device, on a basis of an accuracy of the position estimated by the position estimation unit, the output unit determines whether or not it is necessary to control the moving body so as for the moving body to get away from a road marking that the accuracy of the collation is lower than the predetermined value. According to this mode, the output device can correctly determine whether or not it is necessary to move the vehicle so as for the vehicle to avoid the road marking that the accuracy of the collation is lower than the predetermined value.

In still another mode of the above output device, in a case that the road marking that the accuracy of the collation is lower than the predetermined value exists within a detection range by the detection device, the position estimation unit lowers a weight on the result of the collation to be used to estimate the position. According to this mode, the output device can suitably suppress the deterioration of the accuracy of the estimated position due to the collation result with reference to the road marking that the accuracy of the collation is lower than the predetermined value.

In still another mode of the above output device, a road marking that the accuracy of the collation according to the accuracy information is lower than the predetermined value is a compartment line expressed by complex lines. Generally, such a compartment line expressed by complex lines tends to produce an error between the detection result by the detection device and the map information. Thus, in some embodiments, a compartment line expressed by complex lines is recorded in the accuracy information as a road marking that the accuracy of the collation is lower than the predetermined value.

In still another mode of the above output device, a road marking that the accuracy of the collation according to the accuracy information is lower than the predetermined value is a faded road marking. Generally, a faded (deteriorated) road marking cannot be detected with a high degree of accuracy and therefore tends to produce an error between the detection result by the detection device and the map information. Thus, in some embodiment, a faded road marking is recorded in the accuracy information as a road marking that the accuracy of the collation is lower than the predetermined value.

According to another preferable embodiment of the present invention, there is provided a control method executed by an output device including: a collation process to collate a detection result of a road marking by a detection device with map information; a first acquisition process to acquire accuracy information indicating an accuracy of the collation with respect to each road marking; and an output process to output control information for controlling a moving body so that the accuracy of the collation is equal to or larger than a predetermined value. By executing the control method, the output device can suitably control the moving body so as to perform the above collation with a degree of accuracy higher than the predetermined value.

According to another preferable embodiment of the present invention, there is provided a program executed by a computer, the program causing the computer to function as: a collation unit configured to collate a detection result of a road marking by a detection device with map information; a first acquisition unit configured to acquire accuracy information indicating an accuracy of the collation with respect to each road marking; and an output unit configured to output control information for controlling a moving body so that the accuracy of the collation is equal to or larger than a predetermined value. By executing the above program, the computer can suitably control the moving body so as to perform the above collation with a degree of accuracy higher than the predetermined value. In some embodiments, the above program is stored on a storage medium.

Embodiments

A preferred embodiment of the present invention will be described below with reference to the attached drawings.

[Schematic Configuration]

FIG. 1 is a schematic configuration diagram of a driving support system according to the embodiments. The driving support system illustrated in FIG. 1 roughly includes an onboard device 1 loaded on a vehicle, a lidar (Light Detection and Ranging or Laser Illuminated Detection and Ranging) 2, a gyro sensor 3, a vehicle speed sensor 4 and a GPS receiver 5.

The onboard device 1 is electrically connected with the lidar 2, the gyro sensor 3, the vehicle speed sensor 4 and the GPS receiver 5, and estimates the position of the vehicle (referred to as "own vehicle position") on which the onboard device 1 is loaded based on the outputs of those elements. Then, on the basis of the estimation result of the own vehicle position, the onboard device 1 performs autonomous driving control of the vehicle to guide the vehicle along the route to the set destination. The onboard device 1 includes a map DB (DB: Database) 10 which stores road data and feature information which is information related to the features serving as marks and provided near roads. The features serving as marks may be not only a three-dimensional object such as a kilometer post and a street sign which are periodically provided along the side of the road but also a road marking (road marking paint) such as a compartment line and a sign painted on a road surface. Then, the onboard device 1 estimates the own vehicle position by checking (collating) the output of the lidar 2 with information registered in the map DB 10.

The lidar 2 emits pulse lasers within a predetermined angle range in a horizontal direction and a vertical direction to discretely measure the distance to an object existing in an external field, and generates three-dimensional point cloud information indicating the position of the object. In this case, the lidar 2 includes an irradiation unit which irradiates the laser light while changing the irradiation direction, alight receiving unit which receives the reflected light (scattering light) of the irradiated laser light, and an output unit which outputs scan data based on the light receiving signal outputted by the light receiving unit. The scan data is generated based on the irradiation direction corresponding to the laser light received by the light receiving unit and the response delay time of the laser light specified based on the light receiving signal. Generally, the shorter the distance to the target object is, the higher the accuracy of the distance measurement value outputted by the lidar becomes, whereas the longer the distance to the target object is, the lower the above accuracy becomes. It is noted that the reflection rate of road markings is different from the reflection rate of areas other than the road markings on a road surface. Thus, it is possible to discriminate the point cloud data of the road marking based on the level of the light receiving signal generated in accordance with the light amount of the reflection light. According to the embodiment, the lidar 2 is provided so that the lidar 2 can scan at least the surface of the road where the vehicle is travelling. The lidar 2, the gyro sensor 3, the vehicle speed sensor 4 and the GPS receiver 5 supply the output data to the onboard device 1, respectively.

The onboard device 1 is an example of the "output device" according to the present invention and the lidar 2 is an example of the "detection device" according to the present invention.

Figure 2:
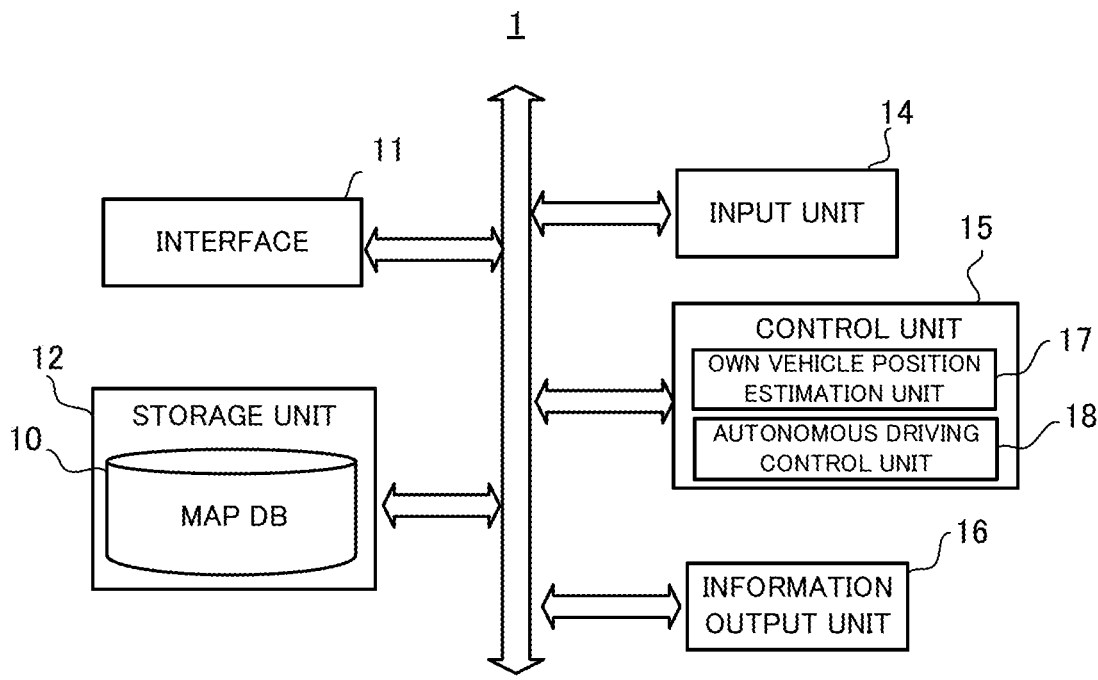
FIG. 2 is a block diagram illustrating a functional configuration of an onboard device.

FIG. 2 is a block diagram illustrating a functional configuration of the onboard device 1. The onboard device 1 mainly includes an interface 11, a storage unit 12, an input unit 14, a control unit 15 and an information output unit 16. These elements are connected with each other by a bus line.

The interface 11 acquires the output data from the sensors such as the lidar 2, the gyro sensor 3, the vehicle speed sensor 4 and the GPS receiver 5, and supplies them to the control unit 15. Also, the interface 11 supplies the signals associated with the driving control of the vehicle, which is generated by the control unit 15, to an ECU (Electronic Control Unit) of the vehicle. A signal which the control unit 15 sends through the interface 11 to the ECU (electronic control device) of the vehicle is an example of the "control information" according to the present invention.

The storage unit 12 stores programs executed by the control unit and information necessary for the control unit 15 to execute predetermined processing. In the embodiments, the storage unit 12 stores the map DB 10 including road marking information.

Figure 3:
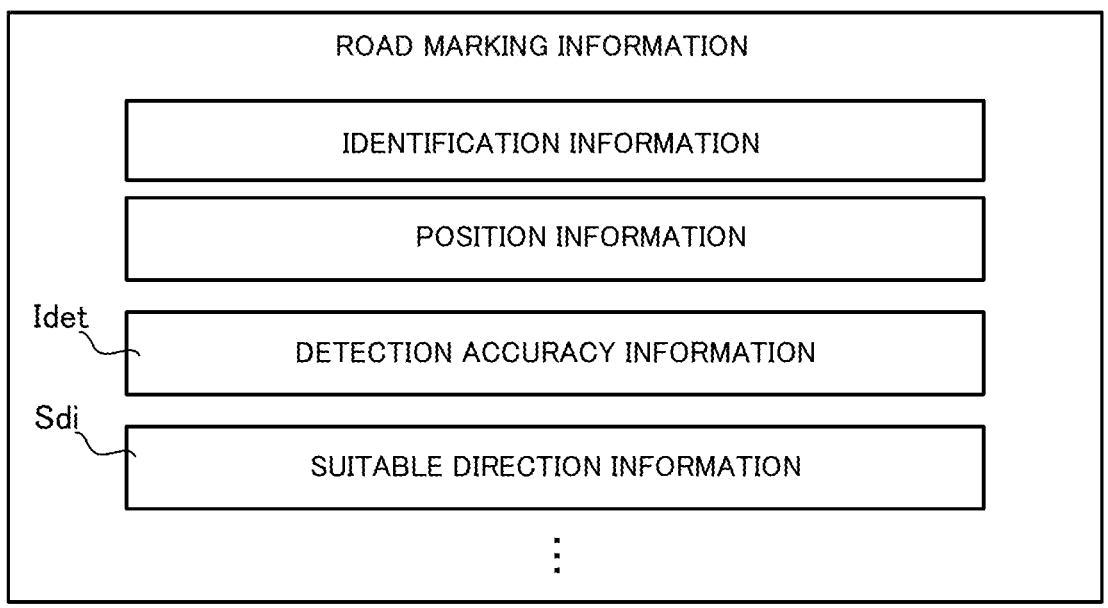
FIG. 3 illustrates an example of the data structure of road marking information included in map DB.

FIG. 3 illustrates an example of the data structure of the road marking information. For example, the road marking information is information associated with road data of a road where the road marking is provided. According to the example illustrated in FIG. 3, the road marking information includes identification information for identifying each individual road marking, position information indicative of the position of each road marking and information (referred to as "detection accuracy information Idet") relating to the detection accuracy at the time of detecting each road marking by external sensor such as the lidar 2. The road marking information also includes information (referred to as "suitable direction information Sdi") indicative of the degree of suitability of each road marking as a reference of the own vehicle position estimation in the travelling direction of the vehicle and in the direction (referred to as "lateral direction") perpendicular to the travelling direction of the vehicle.

The detection accuracy of the road marking indicated by the detection accuracy information Idet indicates the accuracy of collating (checking) the position of the road marking identified based on the output of the lidar 2 with the position of the road marking identified based on the map DB 10. Examples of road markings, whose detection accuracies indicated by the detection accuracy information Idet are low, include not only a road marking with a low detectability in a state where the paint thereof is faded (deteriorated) but also a road marking with an anomalistic shape expressed by complex lines. As described later, the latter road marking is a road marking which tends to generate the difference between the position of the road marking identified based on the output of the lidar 2 and the position of the road marking identified based on the map DB 10. The detection accuracy information Idet may be flag information which indicates whether or not the detection accuracy of the road marking is low or may be numerical information which indicates the staged degree of the detection accuracy. In the former case, the detection accuracy information Idet may be included only in the road marking information corresponding to road markings whose detection accuracy is low. The detection accuracy information Idet is not limited to information directly indicating the detection accuracy but may be information indirectly indicating the detection accuracy. In the latter case, the detection accuracy information Idet may be information relating to the type of the road marking such as information indicating whether or not the road marking has a complex shape.

The suitable direction information Sdi is information indicative of the degree of the suitability of the road marking at the time when the road marking is used as a reference of the own vehicle position estimation in the travelling direction and the lateral direction of the vehicle, in cases where the onboard device 1 estimates the own vehicle position by checking (collating) the position of the road marking detected by the lidar 2 with the position of the road marking registered in the map DB 10. The suitable direction information Sdi is predetermined information generated based on the shape of the road marking in the extending direction on the road surface. Specifically, for example, a stop line extends in the lateral direction of the vehicle. Thus, it is suitable as a reference of the own vehicle position estimation in the travelling direction of the vehicle whereas it is not suitable as a reference of the own vehicle position estimation in the lateral direction of the vehicle. In another example, a solid compartment line continuously extends in the travelling direction of the vehicle. Thus, it is suitable as a reference of the own vehicle position estimation in the lateral direction of the vehicle whereas it is not suitable as a reference of the own vehicle position estimation in the travelling direction of the vehicle. In still another example, a dashed compartment line intermittently extends in the travelling direction, so it is preferable as a reference of the own vehicle position estimation in the lateral direction of the vehicle though it has no advantage over a solid compartment line. In addition, since the edges of the dashed lines can be used as a reference of the own vehicle position estimation in the travelling direction of the vehicle, it is also preferable as a reference of the own vehicle position estimation in the travelling direction of the vehicle. As indicated by the above examples, with respect to each road marking, information indicating the degree of the suitability as a reference of the own vehicle position estimation in the travelling direction and the lateral direction of the vehicle is stored as the suitable direction information Sdi. The suitable direction information Sdi may be flag information which indicates whether or not the degree of the suitability of the road marking is low or may be numerical information which indicates the staged degree of the suitability. In the former case, the suitable direction information Sdi may be included only in the road marking information corresponding to road markings whose degree of the suitability is low. The detection accuracy information Idet is not limited to information directly indicating the degree of the suitability but may be information indirectly indicating the degree of the suitability. In the latter case, the detection accuracy information Idet may be information indicative of the type of the road marking.

It is noted that the map DB 10 may be regularly updated. In this case, for example, through a communication unit not shown, the control unit 15 receives partial map information regarding the area to which the own vehicle position belongs from a server device which manages map information and control unit 15 updates the map DB 10 by using it.

A description will be given of the configuration of the onboard device 1 with reference to FIG. 2 again. The input unit 14 may be buttons, a touch panel, a remote controller or a voice input device to be operated by a user, and receives an input to designate a destination for the route search or an input designating ON or OFF of the autonomous driving. The information output unit 16 may be a display or a speaker for outputting information based on the control by the control unit 15. The information output unit 15 is an example of the "display unit" according to the present invention.

The control unit 15 includes a CPU for executing programs, and controls the entire onboard device 1. In the embodiments, the control unit 15 includes an own vehicle position estimation unit 17, and an autonomous driving control unit 18. The control unit 15 is an example of the "collation unit", "first acquisition unit", "second acquisition unit", "position estimation unit", "output unit", "detection unit" and "computer" which executes a program according to the present invention.

The own vehicle position estimation unit 17 corrects the own vehicle position estimated from the output data of the gyro sensor 3, the vehicle speed sensor 4 and/or the GPS receiver 5 based on the measurement values of the distance and the angle with respect to the feature measured by the lidar 2 and the position information of the feature extracted from the map DB 10. In the embodiments, as an example, the own vehicle position estimation unit 17 alternately executes a prediction step that is a process to estimate the own vehicle position from the output data of the gyro sensor 3 and the vehicle speed sensor 4, etc., by a state estimation method based on Bayesian inference, and a measurement updating step that is a process to correct the estimated value of the own vehicle position calculated in the preceding prediction step.

The autonomous driving control unit 18 refers to the map DB 10, and transmits signals necessary for the autonomous driving control to the vehicle based on the set route and the own vehicle position estimated by the own vehicle position estimation unit 17. The autonomous driving control unit 18 sets a target track based on the set route, and controls the position of the vehicle by transmitting the guide signal to the vehicle such that the own vehicle position estimated by the own vehicle position estimation unit 17 stays within a deviation width smaller than a predetermined width from the target track.

A supplementary explanation will be given of the process of estimating the own vehicle position by the own vehicle position estimation unit 17. The own vehicle position estimation unit 17 successively repeats the prediction step and the measurement updating step to perform the own vehicle position estimation. The state estimation filter used in those steps may be various filters developed to perform the Bayesian inference, for example, an extended Kalman filter, an unscented Kalman filter and a particle filter. Thus, as the position estimation based on the Bayesian inference, various methods are proposed. In the following, as an example, the own vehicle position estimation using the extended Kalman filter will be briefly described.

Figure 4:
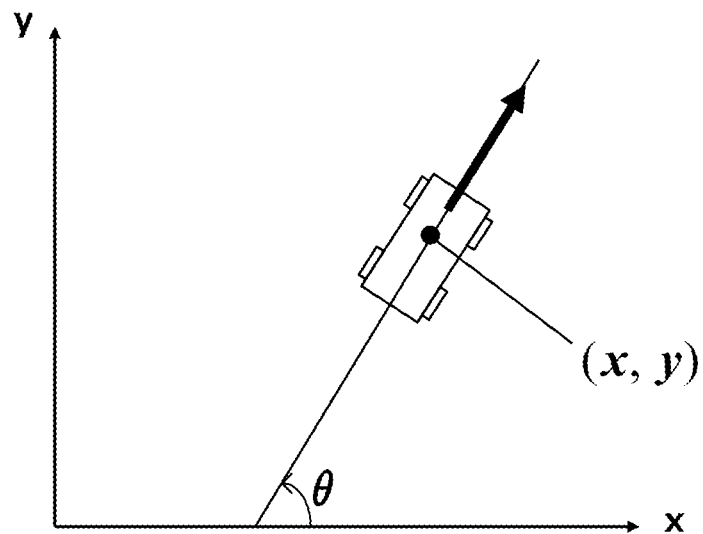
FIG. 4 is a diagram expressing a state variable vector on two-dimensional rectangular coordinates.

FIG. 4 is a diagram expressing a state variable vector X on two-dimensional rectangular coordinates. In the first embodiment, the z-coordinate is projected on the xy-two-dimensional rectangular coordinates. As shown in FIG. 4, the own vehicle position on the plane defined on the xy-two-dimensional rectangular coordinates is expressed by the coordinates "(x, y)" and the azimuth "θ" of the own vehicle. Here, the azimuth θ is defined as an angle formed by the traveling direction of the vehicle and the x-axis. The coordinates (x, y) indicate an absolute position corresponding to the combination of the latitude and the longitude, for example.

Figure 5:
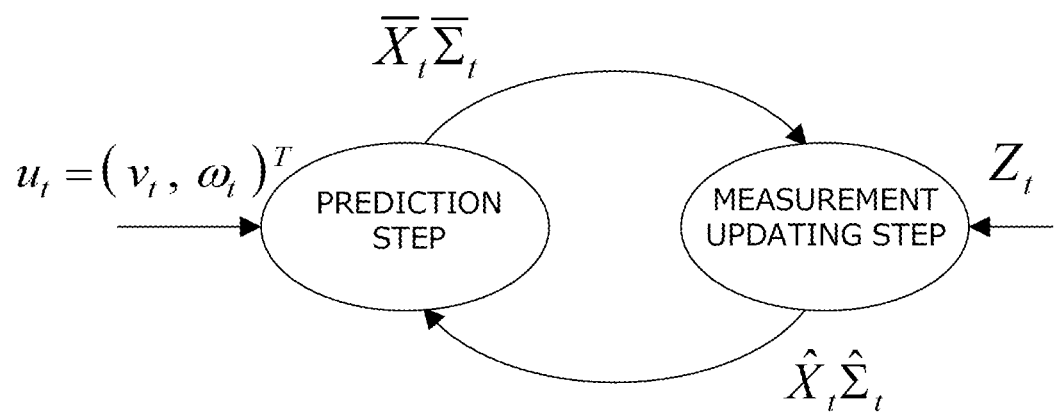
FIG. 5 is a diagram illustrating a schematic relation of a prediction step and a measurement updating step.

FIG. 5 is a diagram illustrating a schematic relation of the prediction step and the measurement updating step. As shown in FIG. 5, by repeating the prediction step and the measurement updating step, calculation and updating of the estimated value of the state variable vector X are successively performed. Here, the state variable vector of the reference time (i.e., current time) "t" subjected to the calculation is expressed as "$X^-_t$" or "$X^\wedge_t$". Hereinafter, the state variable vector is expressed as "$X_t=(x_t, y_t, \theta_t)^T$)". It is noted that a subscript "−" is put to the provisional prediction value predicted by the prediction step, and a subscript "^" is put to the higher-accuracy estimation value updated by the measurement updating step.

At the prediction step, by applying the moving speed "v" of the vehicle and the angular rate "ω" (which are collectively expressed hereinafter as "control value $u_t=(v_t, \omega_t)^T$") to the state variable vector $X^\wedge_{t-1}$ at the time t−1 calculated at the last measurement updating step, the own position estimator 17 calculates an estimated value (referred to as "prior estimated value") $X^-_t$ of the own vehicle position at the time t. At the same time, the own position estimator 17 calculates, from a covariance matrix "$\Sigma^-_{t-1}$" calculated at the time t−1 of the last measurement updating step, a covariance matrix "$\Sigma^-_t$" corresponding to the error distribution of the prior estimated value $X^-_t$.

At the measurement updating step, the own vehicle position estimation unit 17 associates the position vector of a feature registered in the map DB 10 and the scan data of the lidar 2. Then, when they are associated, the own vehicle position estimation unit 17 acquires the measurement value (hereinafter referred to as "measurement value") "$Z_t$" of the associated feature by the lidar 2 and the estimated measurement value "$Z^\wedge_t$" of the feature acquired by modelling the measurement processing by the lidar 2 using the prior estimated value $X^-_t$ and the position vector of the feature registered in the map DB 10, respectively. The measurement value $Z_t$ is a two-dimensional vector indicating the distance and the scan angle of the feature measured at the time t by the lidar 2. Then, the own vehicle position estimation unit 17 multiples the difference between the measurement value $Z_t$ and the estimated measurement value $Z^\wedge_t$ by a Kalman gain "$K_t$" and add it to the prior estimated value $X^-_t$. Thereby, as indicated by the following equation (1), the own vehicle position estimation unit 17 calculates the updated state variable vector (referred to as "post estimated value") $X^\wedge_t$.

$$X^\wedge_t = X^-_t + K_t(Z_t - Z^\wedge_t) \quad (1)$$

At the measurement updating step, in the same way as the prediction step, the own vehicle position estimation unit 17 calculates, from the prior covariance matrix $\Sigma^-_t$, a covariance matrix $\Sigma^\wedge_t$ corresponding to the error distribution of the post estimated value $X^\wedge_t$. The parameters such as Kalman gain $K_t$ can be calculated in the same way as a known own-position estimation method using an extended Kalman filter.

When the post estimated value $X^\wedge_t$ is calculated through the equation (1) with reference to the road marking whose detection accuracy indicated by the detection accuracy information Idet is low, the difference between the measurement value $Z_t$ calculated based on the output of the lidar 2 and the estimated measurement value $Z^\wedge_t$ calculated by use of the position vector of the feature registered in the map DB 10 becomes large. Namely, in this case, the difference "$Z_t-Z^\wedge_t$" multiplied by the Kalman gain $K_t$ becomes large. In this case, the estimation accuracy of the post estimated value $X^\wedge_t$ calculated through the equation (1) becomes low.

Above things considered, the autonomous driving control unit 18 controls the vehicle so as to avoid estimating the position with reference to such a road marking whose detection accuracy indicated by the detection accuracy information Idet is low. Thereby, the autonomous driving control unit 18 suitably suppress the deterioration of the accuracy of the estimated position. The specific control method thereof will be described in the following sections "First Vehicle Control Based on Road Marking Information" and "Second Vehicle Control Based on Road Marking Information".

"First Vehicle Control Based on Road Marking Information"

The first vehicle control based on the road marking information is to correct the target track so that the vehicle changes lanes in cases where the vehicle is travelling on a lane with a road marking whose detection accuracy is low.

(1-1) Process Flow

Figure 6:
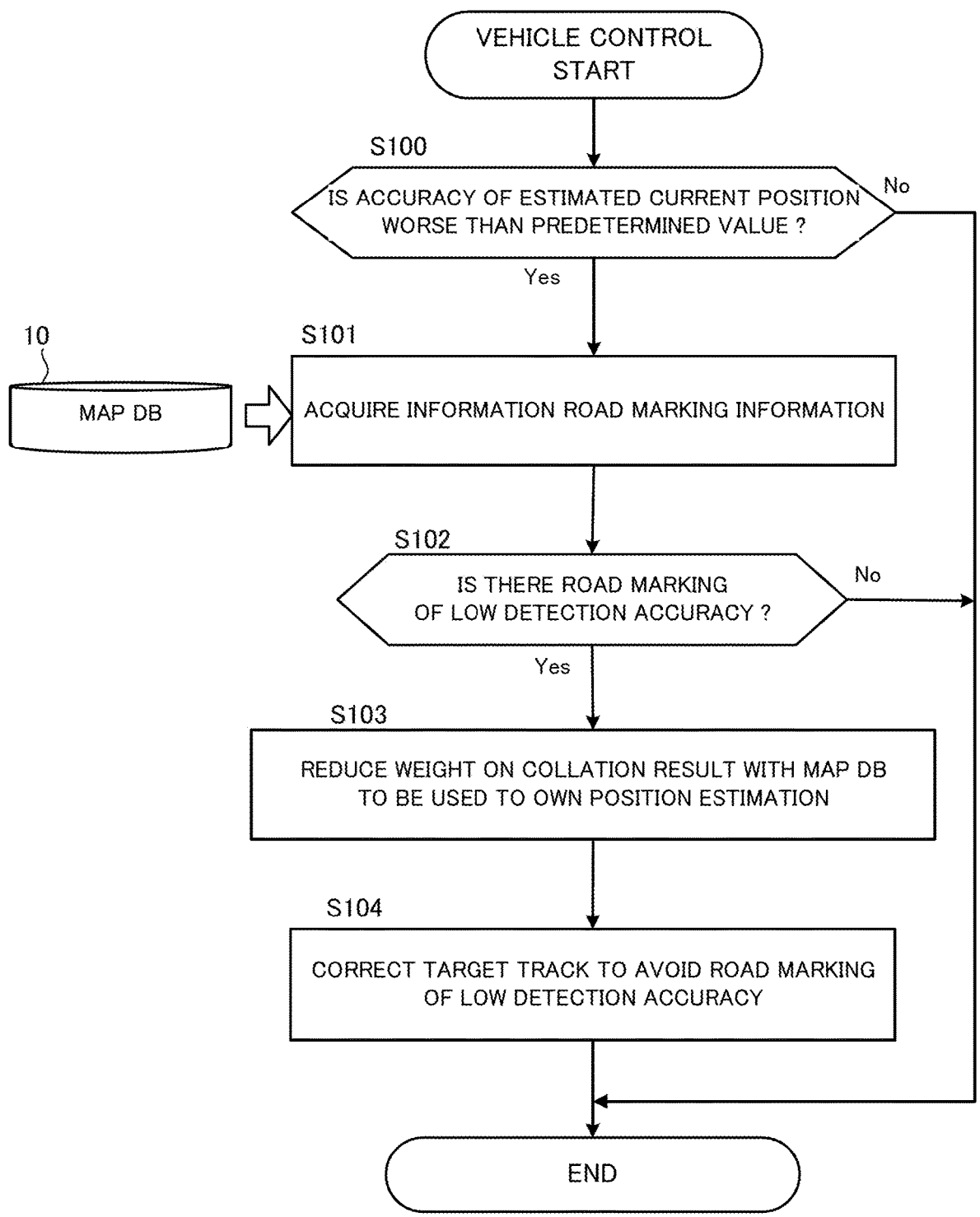
FIG. 6 illustrates a flowchart indicating the first vehicle control based on the road marking information.

FIG. 6 illustrates a flowchart indicating the first vehicle control executed by the autonomous driving control unit 18 based on the road marking information. According to the flowchart in FIG. 6, the autonomous driving control unit 18 corrects the predetermined target track of the vehicle if, near the target track, there is a road marking whose detection accuracy is determined to be low according to the detection accuracy information Idet of the road marking information. It is noted that the autonomous driving control unit 18 has already set the target track of the vehicle along the route to the set destination by the time of the beginning of the execution of the flowchart in FIG. 6.

First, the autonomous driving control unit 18 determines whether or not the accuracy of the estimated current position is worse (lower) than a predetermined value (step S100). For example, the autonomous driving control unit 18 determines that the accuracy of the estimated current position is worse than the predetermined value if the length of the major axis of the error ellipse identified based on the covariance matrix of the error acquired in the calculation process of the position estimation based on the extended Kalman filter is longer than a predetermined length. Then, when the accuracy of the estimated current position is worse than the predetermined value (step S100; Yes), the autonomous driving control unit 18 proceeds with step S101. In contrast, when the accuracy of estimated current position is not worse than the predetermined value (step S100; No), the autonomous driving control unit 18 ends the process of the flowchart.

When the accuracy of the estimated current position is worse than the predetermined value, the autonomous driving control unit 18 acquires, from the map DB 10, the road marking information associated with the road data of the road(s) which constitutes the route to the destination (step S101). In this case, for example, the autonomous driving control unit 18 acquires from the map DB 10 the road marking information corresponding to the road(s) on the route existing within a predetermined distance from the current position.

Then, the autonomous driving control unit 18 determines whether or not, near the target track (e.g., on the same lane as the target track), there is such a road marking track that the detection accuracy ("referred to as "low detection accuracy") thereof indicated by the detection accuracy information Idet is lower than a threshold (step S102). For example, the above threshold is determined in advance through experimental trials in consideration of the presence/absence of the deterioration of the accuracy of the position estimated by the own vehicle position estimation unit 17 and is stored on the storage unit 12 in advance.

Then, if the autonomous driving control unit 18 determines that there is a road marking near the target track whose detection accuracy indicated by the detection accuracy information Idet is a low detection accuracy (step S102; Yes), the autonomous driving control unit 18 reduces the weight on the collation result with the map DB 10 to be used to the own vehicle position estimation (step S103). For example, for such a travelling section where the road marking thereof corresponding to the low detection accuracy is possibly within a measurement range by the lidar 2, the autonomous driving control unit 18 multiplies "$K_t (Z_t - Z\hat{}_t)$" in the equation (1) by a coefficient smaller than 1. Thereby, according to step S103, the autonomous driving control unit 18 can suitably reduce the deterioration of the accuracy of the estimated position even when the road marking corresponding to the low detection accuracy is within the measurement range by the lidar 2.

The autonomous driving control unit 18 corrects the target track of the vehicle to avoid (get away from) the road marking corresponding to the low detection accuracy (step S104). Specifically, the autonomous driving control unit 18 corrects the target track to move on a lane other than the lane on which the road marking of the low detection accuracy is provided. In another example, in such a case that a compartment line of the low detection accuracy is provided on one side of a single lane road where the vehicle is travelling, the autonomous driving control unit 18 corrects the target track within the lane to make the travelling position approximate to the comportment line on the other side of the comportment line of the low detection accuracy. In these ways, the autonomous driving control unit 18 controls the vehicle to get away from the road marking corresponding to the low detection accuracy, thereby suitably suppressing the position estimation with reference to the road marking corresponding to the low detection accuracy.

(1-2) Specific Example

Figure 7:
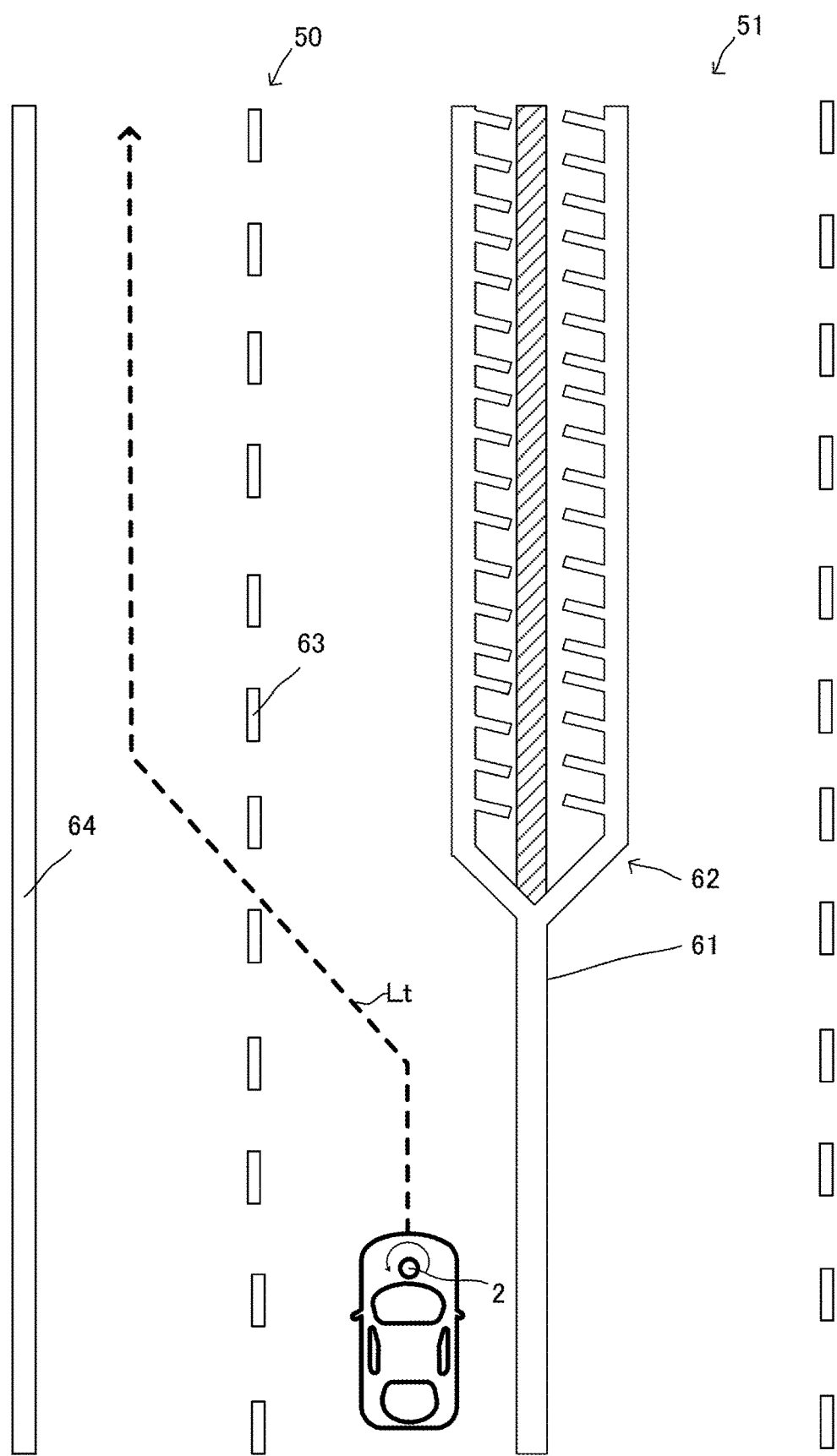
FIG. 7 illustrates a plane view of the vehicle travelling on a two-lane road where a road marking corresponding to a low detection accuracy is on the right.

FIG. 7 illustrates a plane view of the vehicle travelling on a two-lane road 50 where a complex road marking corresponding to the low detection accuracy is on the right. According to FIG. 7, there are a single compartment line 61 and a complex compartment line 62 for separating the road 50 and the opposite road 51. The single compartment line 61 is a compartment line consisting of a white line and the complex compartment line 62 is mixed compartment lines including white lines and an orange line. The complex compartment line 62 includes the comb-shaped white lines on both sides of the orange line for emphasizing the orange line. The dashed line "Lt" illustrates the target track of the vehicle set by the autonomous driving control unit 18.

Since the complex compartment line 62 includes the comb-shaped white lines on both sides of the orange line, not only the point cloud data of the orange line but also the point cloud data of the comb-shaped white lines on both sides thereof are obtained at the time of detection of the complex compartment line 62 by the lidar 2. Generally, at the time of determining the measurement position (measurement value Z in FIG. 5) of the feature by the lidar 2 in the own vehicle position estimation, the own vehicle position estimation unit 17 calculates the two-dimensional centroid coordinates of the feature with respect to the vehicle based on the point cloud data of the reference feature with respect to the vehicle. In this case, according to the position estimation with reference to the complex compartment line 62, the point cloud data having a large variability in the road width direction is obtained. Thus, in this case, the measurement position (measurement value Z in FIG. 5) is determined based on the point cloud data having a large variability in the road width direction and therefore the accuracy of the measurement value Z indicating the coordinates of the position of the complex compartment line 62 measured by the lidar 2 is relatively low. Thus, in the case of the example illustrated in FIG. 7, the detection accuracy indicated by the detection accuracy information Idet of the road marking information corresponding to the complex compartment line 62 is determined as the low detection accuracy that is lower than the detection accuracy indicated by the detection accuracy information Idet of the road marking information corresponding to the other compartment lines 63 and 64.

In this case, by referring to the road marking information in the map DB 10 associated with the road 50 where the vehicle is travelling, the autonomous driving control unit 18 determines that the detection accuracy indicated by the detection accuracy information Idet of the road marking information corresponding to the complex compartment line 62 is a low detection accuracy that is lower than a threshold. Thus, in this case, in order to avoid estimating the position with reference to the complex compartment line 62, the autonomous driving control unit 18 determines the target track (see the dashed line Lt) to change lanes to move on the left lane in the road 50 that is not adjacent to the complex compartment line 62. When the vehicle travels along the target track indicated the dashed line Lt, the compartment lines 63 and 64 are the nearest compartment lines at the time of going past the complex compartment line 62. Thus, in this case, the own vehicle position estimation unit 17 estimates the position with reference to the compartment line 63 and/or the compartment line 64, therefore keeping the positional accuracy in the lateral direction of the vehicle in a high level.

Figure 8:
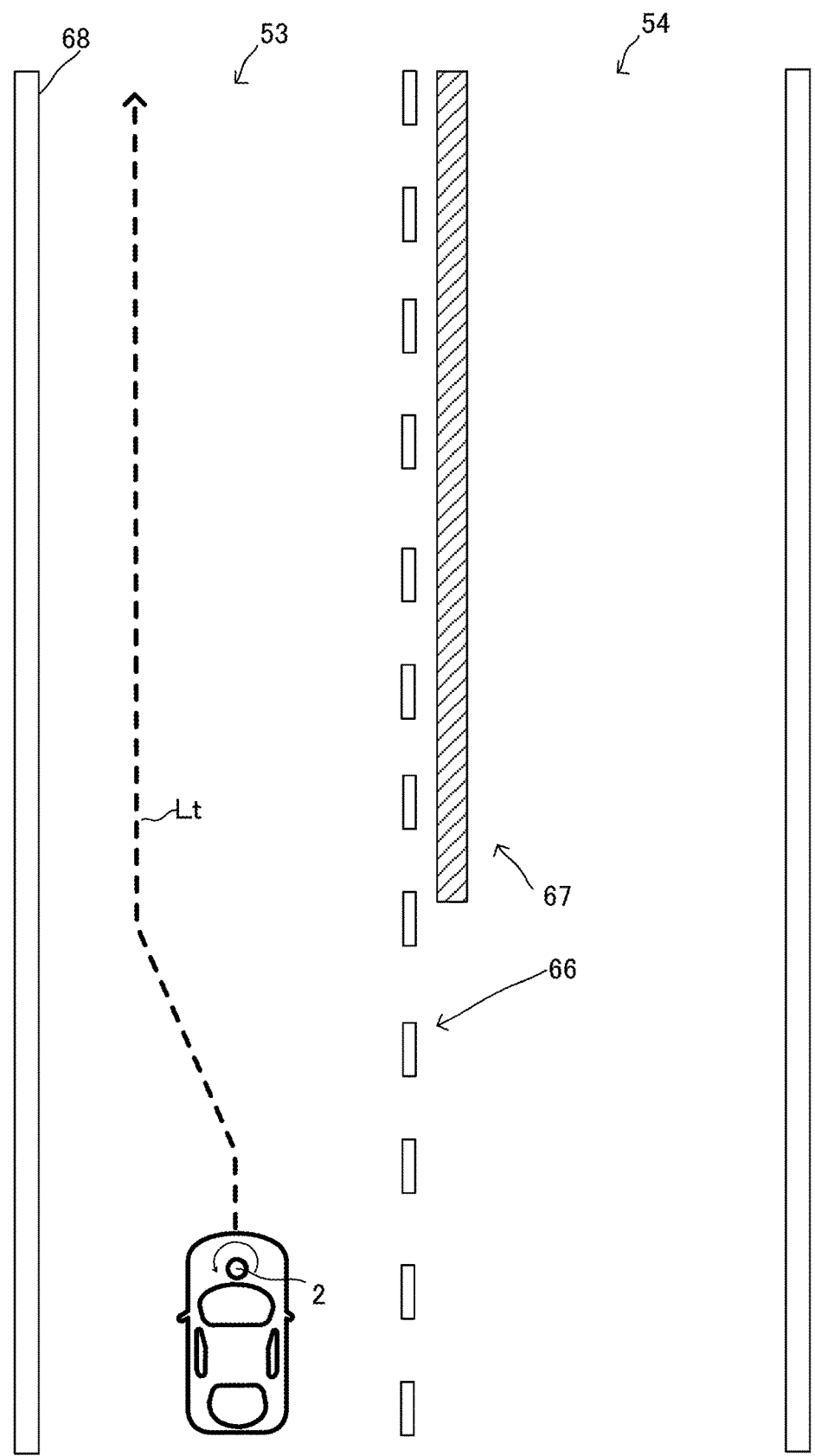
FIG. 8 illustrates a plane view of the vehicle travelling on a road having a single lane each way on which a road marking of a low detection accuracy is provided.

FIG. 8 illustrates a plane view of the vehicle travelling on a road having a single lane each way on which a road marking of the low detection accuracy is provided. According to FIG. 8, between the single lane road 53 and the opposite road 54, there are provided a single compartment line 66 and a complex compartment line 67. The single compartment line 66 has a dashed white line and the complex compartment line 67 has a dashed white line and an orange line.

In the case of the example illustrated in FIG. 8, not only the point cloud data of the dashed white line but also the point cloud data of the orange line are obtained at the time of detection of the complex compartment line 67 by the lidar 2. In this case, as the point cloud data of the complex compartment line 67, the point cloud data having a large variability in the road width direction is obtained from the lidar 2 and therefore the accuracy of the measurement value Z corresponding to the complex compartment line 67 is relatively low. Thus, in the case of the example illustrated in FIG. 8, the detection accuracy indicated by the detection accuracy information Idet of the road marking information corresponding to the complex compartment line 67 is determined as the low detection accuracy.

In this case, by referring to the road marking information in the map DB 10 associated with the road 53 where the vehicle is travelling, the autonomous driving control unit 18 determines that the detection accuracy indicated by the detection accuracy information Idet of the road marking information corresponding to the complex compartment line 67 is a low detection accuracy that is lower than a threshold. Thus, in this case, in order to avoid estimating the position with reference to the complex compartment line 67, the autonomous driving control unit 18 determines the target track (see the dashed line Lt) to travel on the position nearer to the compartment line 68 than the complex compartment line 67 on the road 53. When the vehicle travels along the target track indicated the dashed line Lt, the compartment line 68 is the nearest compartment lines at the time of going past the complex compartment line 67. Thus, in this case, the own vehicle position estimation unit 17 estimates the position with reference to the compartment line 68, therefore keeping the positional accuracy in the lateral direction of the vehicle in a high level.

Figure 9A:
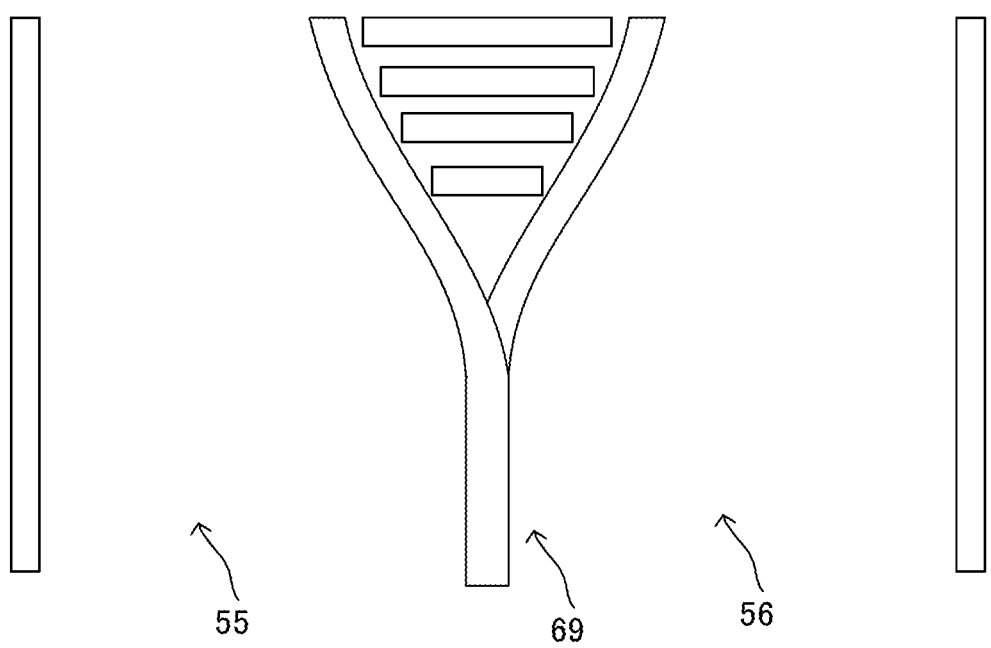
FIGS. 9A and 9B illustrate examples of a road marking of a low detection accuracy.

FIG. 9A illustrates another example of the road marking whose detection accuracy indicated by the detection accuracy information Idet is the low detection accuracy. As illustrated in FIG. 9, the complex compartment line 69 is provided between a road 55 and the opposite road 56. The width of the complex compartment line 69 gradually changes along the road 55. For such a complex compartment line 69, the detection accuracy indicated by the detection accuracy information Idet of the road marking information is also set to the low detection accuracy.

Figure 9B:
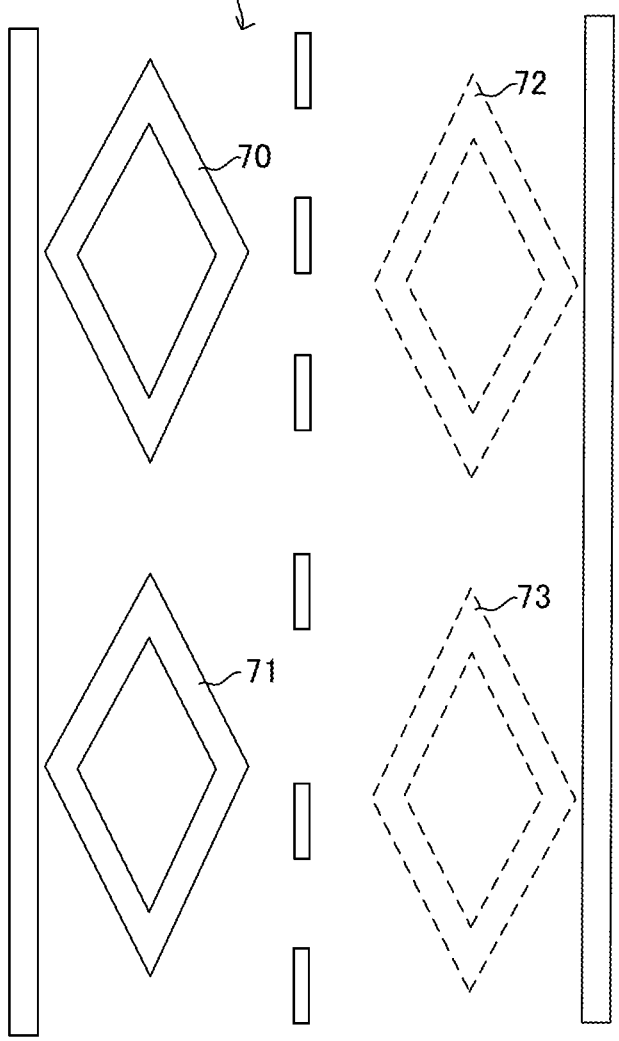

FIG. 9B illustrates a road 57 with two lanes on which the traffic markings 70 to 73 are provided. In the example illustrated in FIG. 9B, the traffic markings 70 and 71 provided on the left lane in the road 57 are not faded whereas the traffic markings 72 and 73 provided on the right lane in the road 57 are faded. In the road marking information corresponding to the traffic markings 72 and 73, the detection accuracy information Idet indicative of the low detection accuracy is registered. Thus, in the example illustrated in FIG. 9B, when the vehicle passes through the road 57, the autonomous driving control unit 18 determines, on the basis of the detection accuracy information Idet of the road marking information corresponding to the traffic markings 70 to 73, that the vehicle should avoid travelling on the lane where the traffic markings 72 and 73 are provided. Then, the autonomous driving control unit 18 determines the target track so as for the vehicle to travel on the left lane having the traffic markings 70 and 71 thereon whose detection accuracy indicated by the detection accuracy information Idet is equal to or larger than a threshold.

(1-3) Application to Route Search

At the time of searching for a route to a destination, by referring to the detection accuracy information Idet of the road marking information, the autonomous driving control unit 18 may search for the route which avoids a road marking corresponding to the low detection accuracy.

In this case, for example, on the basis of Dijkstra's algorithm, the autonomous driving control unit 18 searches for such a route that the sum of link costs is the smallest wherein each of the link costs is calculated per road in consideration of the necessary time and the distance. In this case, in addition to the cost based on the necessary time and the distance, the autonomous driving control unit 18 adds the cost based on the detection accuracy indicated by the detection accuracy information Idet to the link cost. In this case, for example, the cost added based on the detection accuracy information Idet increases with decreasing detection accuracy indicated by the detection accuracy information Idet. Accordingly, the autonomous driving control unit 18 can suitably search for a route composed of roads whose detection accuracy indicated by the detection accuracy information Idet is high. In addition, by adding the cost based on the detection accuracy information Idet, that is much larger than the cost based on the necessary time and the distance, to the link cost corresponding to such a road having the road marking corresponding to the low detection accuracy, the autonomous driving control unit 18 can search for a route substantially avoiding the road having the road marking corresponding to the low detection accuracy.

Figure 10:
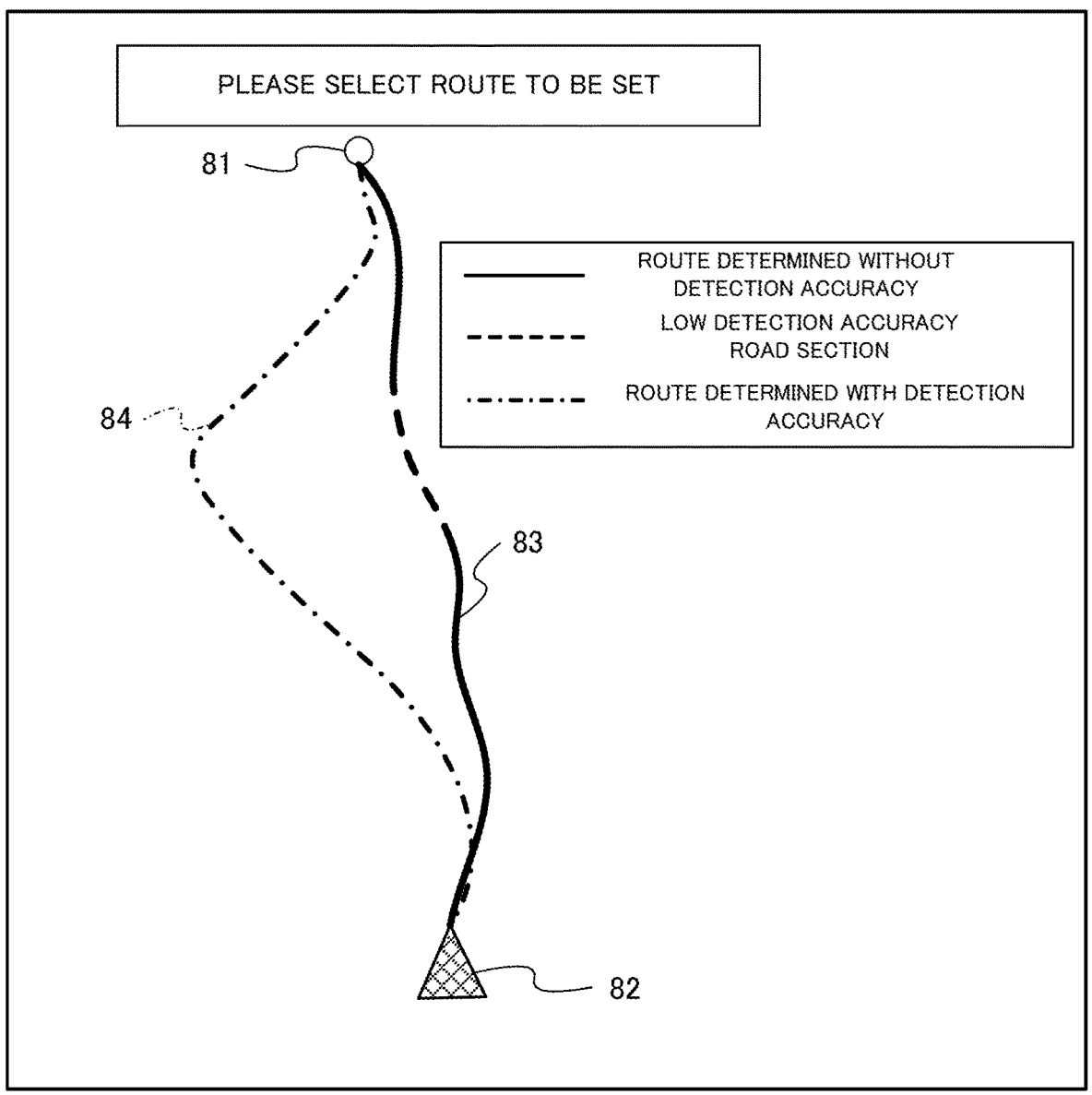
FIG. 10 schematically illustrates a route selection screen.

FIG. 10 schematically illustrates a route selection screen displayed by the information output unit 16. On the basis of the destination specified through the user input, the autonomous driving control unit 18 searches for a recommended route (referred to as "determined without detection accuracy route") 83 based on a normal route search without considering the detection accuracy information Idet and a recommended route (referred to as "determined with detection accuracy route") 84 based on a route search in consideration of the detection accuracy information Idet and displays them on the route selection screen. According to FIG. 10, the autonomous driving control unit 18 displays, by a dashed line, a low detection accuracy road section that is a road section of the determined without detection accuracy route 83 including road marking(s) corresponding to the low detection accuracy. In FIG. 10, the mark 81 indicates the destination and the mark 82 indicates the current position.

According to the example illustrated in FIG. 10, the determined without detection accuracy route 83 includes the low detection accuracy road section that is a road section including road marking(s) corresponding to the low detection accuracy and therefore the accuracy of the estimated position could be decreased in the road section. In contrast, the determined with detection accuracy route 84 does not have any low detection accuracy road section. Thus, if the determined with detection accuracy route 84 is selected as the target route, the autonomous driving control unit 18 can suitably perform the position estimation with reference to a road marking. In this way, by using the road marking information for route search, the autonomous driving control unit 18 can let the user select, as the target route, a route avoiding any road section where a road marking corresponding to the low detection accuracy is provided.

[Second vehicle Control Based on Road Marking Information]

The second vehicle control based on the road marking information is: to search, on the basis of the detection accuracy information Idet and the suitable direction information Sdi included in the road marking information, for a road marking suitable as a reference of the own vehicle position estimation in the traveling direction or the lateral direction whichever error is larger, in a case that the error of the estimated position in the travelling direction or the lateral direction is larger than a threshold; and to correct the target track so as for the vehicle to approach the above road marking suitable as the reference of the own vehicle position estimation.

(2-1) Process Flow

Figure 11:
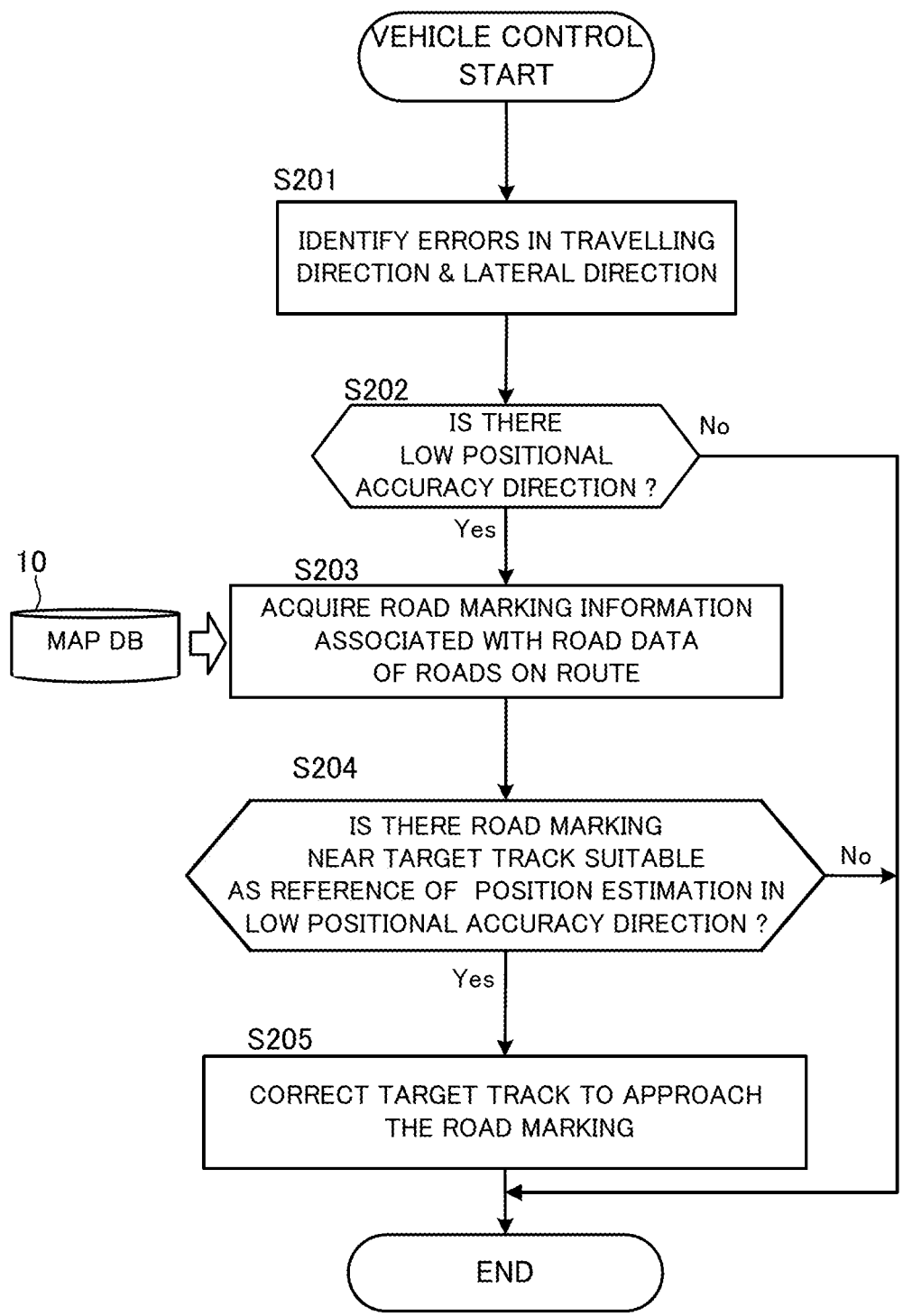
FIG. 11 illustrates a flowchart indicating the second vehicle control based on the road marking information.

FIG. 11 is a flowchart indicating the second vehicle control based on the road marking information executed by the autonomous driving control unit 18. According to the flowchart in FIG. 11, the autonomous driving control unit 18 searches, on the basis of the detection accuracy information Idet and the suitable direction information Sdi included in the road marking information, for a road marking suitable as a reference of the own vehicle position estimation in the traveling direction or the lateral direction whichever error is larger and corrects the target track of the vehicle if the suitable road marking exists near the target track. It is noted that the autonomous driving control unit 18 has already set the target track of the vehicle along the route to the set destination by the time of the beginning of the execution of the flowchart in FIG. 11.

First, the autonomous driving control unit 18 identifies each error of the estimated position in the travelling direction and in the lateral direction of the vehicle (step S201). For example, the autonomous driving control unit 18 identifies each error of estimated position in the travelling direction and in the lateral direction of the vehicle, respectively, by converting a covariance matrix of the errors, which is acquired in the calculation process of the estimated position based on the extended Kalman filter, by using a rotation matrix in which the azimuth θ of the own vehicle is used.

Next, the autonomous driving control unit 18 monitors each accuracy of the position estimated by the own vehicle position estimation unit 17 in the travelling direction and the accuracy of the estimated position in the lateral direction. Then, the autonomous driving control unit 18 determines whether or not there exists such a direction (referred to as "low positional accuracy direction Dtag") in which the accuracy of the estimated position is low (step S202). For example, the autonomous driving control unit 18 compares each error of the estimated position, identified at step S201, in the travelling direction and in the lateral direction with a threshold and thereby detects the direction in which the error of the estimated position is larger than the threshold as the low positional accuracy direction Dtag. Then, the autonomous driving control unit 18 determines whether or not the low positional accuracy direction Dtag is detected. The travelling direction and the lateral direction of the vehicle are examples of the "first direction" and the "second direction" according to the present invention, respectively.

When determining that the low positional accuracy direction Dtag does not exist (step S202; No), the autonomous driving control unit 18 determines that there is no need to correct the target track of the vehicle and ends the process of the flowchart. In contrast, when determining that the low positional accuracy direction Dtag exists (step S202; Yes), the autonomous driving control unit 18 acquires from the map DB 10 the road marking information associated with the road data corresponding to roads constituting the route to the destination (step S203). In this case, for example, the autonomous driving control unit 18 acquires from the map DB 10 the road marking information corresponding to roads on the route situated within a predetermined distance from the current position.

Then, the autonomous driving control unit 18 determines whether or not a road marking, which is suitable as a reference for the own vehicle position estimation in the low positional accuracy direction Dtag, is situated near the target track (step S204). In this case, on the basis of the detection accuracy information Idet and the suitable direction information Sdi included in the road marking information, among road markings near the target track, the autonomous driving control unit 18 searches for a road marking that is suitable as a reference for the own vehicle position estimation in the low positional accuracy direction Dtag, wherein the autonomous driving control unit 18 omits, from the above road markings near the target track, such road marking(s) determined that the detection accuracy is lower than a threshold and such road marking(s) determined to be unsuitable as a reference for the own vehicle position estimation in the low positional accuracy direction Dtag. Then, on the basis of the search result, the autonomous driving control unit 18 determines whether or not there is a road marking suitable as a reference for the own vehicle position estimation in the low positional accuracy direction Dtag.

Then, when the autonomous driving control unit 18 determines that a road marking, which is suitable as a reference for the own vehicle position estimation in the low positional accuracy direction Dtag, is situated near the target track (step S204; Yes), the autonomous driving control unit 18 corrects the target track of the vehicle so as for the vehicle to approach the above road marking (step S205). Specifically, the autonomous driving control unit 18 corrects the target track so that the vehicle moves on the lane where the road marking suitable as the reference is provided. If there are multiple road markings suitable as the reference of the own vehicle position estimation, the autonomous driving control unit 18 may correct the target track so as for the vehicle to move on the lane where the most suitable road marking as the reference is provided or to move on the lane where the road marking nearest to the target track among the multiple road makings is provided. In another example, if a compartment line suitable as the reference is provided on one side of a single lane road where the vehicle is travelling, the autonomous driving control unit 18 corrects the target track within the range of the lane so as to shift the travelling position to the side of the compartment line. In contrast, when the autonomous driving control unit 18 determines that a road marking, which is suitable as a reference for the own vehicle position estimation in the low positional accuracy direction Dtag, is not situated near the target track (step S204; No), the autonomous driving control unit 18 determines that there is no need to correct the target track of the vehicle. Then, the autonomous driving control unit 18 ends the process of the flowchart.

As explained above, if there exists near the target track such a road marking that is suitable as a reference for the own vehicle position estimation in the low positional accuracy direction Dtag, the autonomous driving control unit 18 controls the vehicle so as to approach the above road marking. Thereby, the autonomous driving control unit 18 can suitably perform the position estimation using the above road marking as the reference.

For the second vehicle control based on the road marking information, in the same way as the first vehicle control, at the time of determining that there exists near the target track such a road marking whose detection accuracy indicated by the detection accuracy information Idet is the low detection accuracy, the autonomous driving control unit 18 may reduce the weight on the collation result with the map DB 10 to be used to the own vehicle position estimation. Thereby, the autonomous driving control unit 18 suitably reduces the deterioration of the accuracy of the estimated position even when there exists within the measurement range by the lidar 2 such a road marking corresponding to the low detection accuracy.

(2-2) Specific Example

Figure 12:
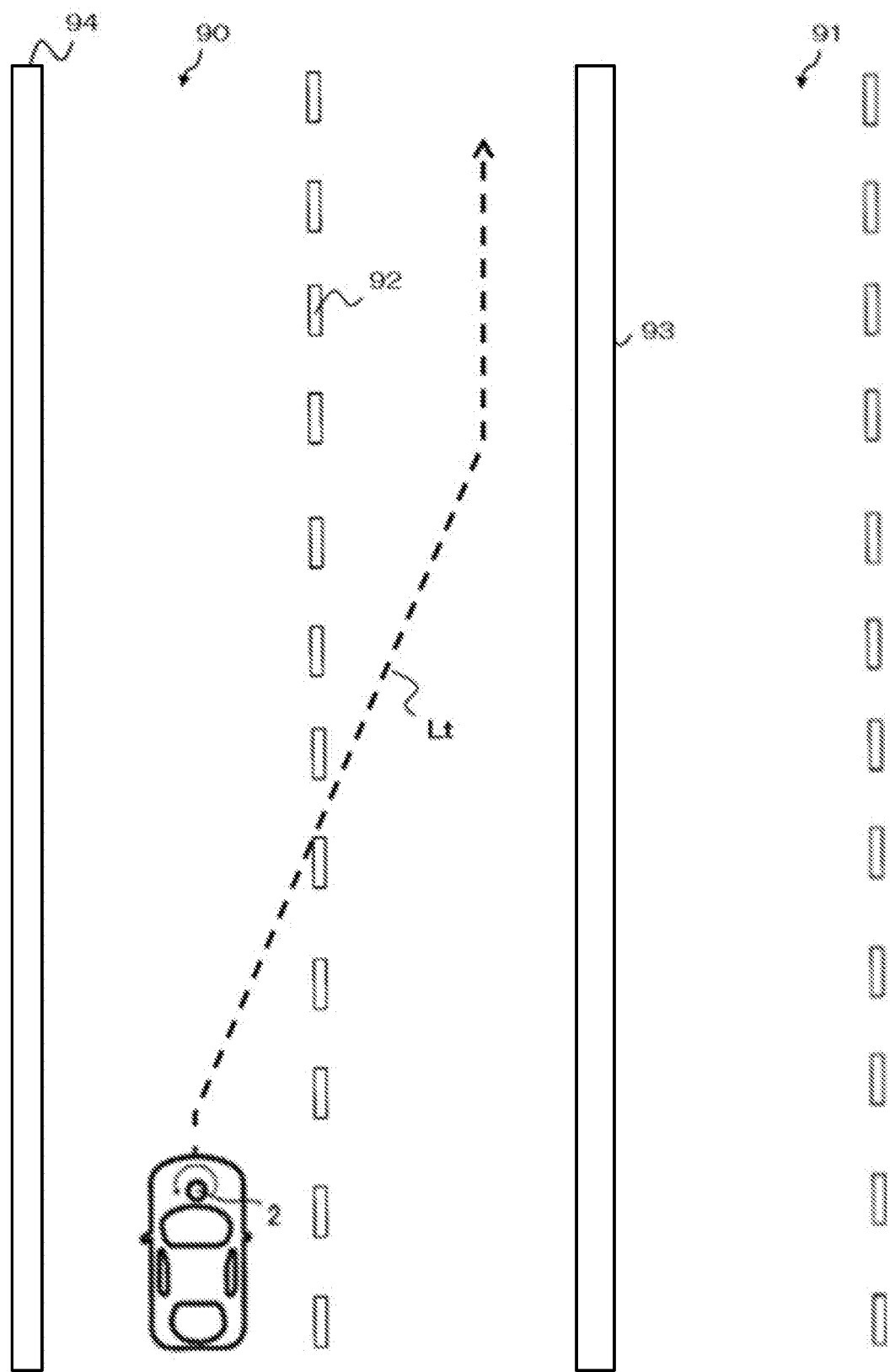
FIG. 12 illustrates a plane view of the vehicle travelling on a two-lane road where a road marking corresponding to a low detection accuracy is on the left.

FIG. 12 illustrates a plane view of the vehicle travelling on a two-lane road 90 where a road marking corresponding to the low detection accuracy is on the left. In the example illustrated in FIG. 12, there exists a solid line 93 that is a compartment line for separating the road 90, the road 91 opposite to the road 90, a dashed line 92 that is a compartment line for separating lanes in the road 90 and a solid line 94 that is a compartment line on the left side of the road 90. It is assumed that the solid line 94 is faded. The dashed line "Lt" indicates the target track of the vehicle which the autonomous driving control unit 18 determines.

Since the solid line 94 is faded, the detection accuracy indicated by the detection accuracy information Idet of the road marking information corresponding to the solid line 94 is set to a low detection accuracy lower than the detection accuracy indicated by the detection accuracy information Idet of the road marking information corresponding to the dashed line 92 and the solid line 93. Since the solid line 93 and the solid line 94 continuously extend in the travelling direction of the vehicle, the suitable direction information Sdi of the road marking information corresponding to the solid line 93 and the solid line 94 is determined to be information indicating that they are the most suitable road markings as a reference for the own vehicle position estimation in the lateral direction and that they are unsuitable as a reference for the own vehicle position estimation in the travelling direction. Since the dashed line 92 intermittently extends in the travelling direction, the suitable direction information Sdi of the road marking information corresponding to the dashed line 92 is determined to be information indicating that it is suitable as a reference for the own vehicle position estimation in the lateral direction and that it is also suitable as a reference for the own vehicle position estimation in the travelling direction.

It is herein assumed that the autonomous driving control unit 18 determines that the error of the own vehicle position estimation in the lateral direction of the vehicle is larger than a threshold, i.e., the autonomous driving control unit 18 determines that the lateral direction of the vehicle is the low positional accuracy direction Dtag. In this case, the autonomous driving control unit 18 refers to the road marking information in the map DB 10 corresponding to the dashed line 92, the solid line 93 and solid line 94. Then, the autonomous driving control unit 18 firstly omits the solid line 94 from candidates of the reference to be used in the position estimation since the detection accuracy information Idet corresponding to the solid line 94 indicates the low detection accuracy. Next, by referring to the suitable direction information Sdi corresponding to the dashed line 92 and the solid line 93 that are the remaining candidates of the reference, the autonomous driving control unit 18 compares the degrees of the suitability thereof for the own vehicle position estimation in the lateral direction of the vehicle that is the low positional accuracy direction Dtag. Since the degree of the suitability of the solid line 93 is higher, the autonomous driving control unit 18 determines the solid line 93 as the reference of the position estimation. Then, the autonomous driving control unit 18 corrects the target track so as for the vehicle to approach the solid line 93. When controlling the vehicle to travel in accordance with the target track indicated by the dashed line Lt, the own vehicle position estimation unit 17 estimates the position with reference to the solid line 93. Thereby, it is possible to the maintain the positional accuracy in the lateral direction of the vehicle in a high level. Thereafter, if the travelling direction of the vehicle is also determined to be the low positional accuracy direction Dtag, the autonomous driving control unit 18 slightly corrects the target track to approach the dashed line 92 within the current lane. Thereby, the autonomous driving control unit 18 can also maintain the positional accuracy in the travelling direction of the vehicle in a high level.

Instead of the above approach, in some embodiments, regarding each of the dashed line 92, the solid line 93 and the solid line 94, the autonomous driving control unit 18 converts the detection accuracy indicated by the detection accuracy information Idet and the degree of the suitability indicated by the suitable direction information Sdi into scores through predetermined algorithms, respectively. Then, on the basis of the score of the detection accuracy and the score of the degree of the suitability, the autonomous driving control unit 18 may comprehensively determine the road marking suitable as the reference to be used in the own vehicle position estimation in the low positional accuracy direction Dtag.

It is noted that such a case where the error of the own vehicle position estimation in the lateral direction of the vehicle is larger than a threshold is explained with the above example. In contrast, in cases that the error of the own vehicle position estimation in the travelling direction of the vehicle is larger than the threshold, it is necessary to determine, as the reference of the own vehicle position estimation, such a road marking whose degree of the suitability for the own vehicle position estimation in the travelling direction of the vehicle according to the suitable direction information Sdi is high. If both of the error of the own vehicle position estimation in the travelling direction of the vehicle and the error of the own vehicle position estimation in the lateral direction are larger than the threshold, it is necessary to determine, as the reference of the own vehicle position estimation, such a road marking whose degrees of the suitability for the own vehicle position estimation in the travelling direction and in the lateral direction of the vehicle according to the suitable direction information Sdi are both larger than a threshold.

As described above, the onboard device 1 according to the embodiment is provided with the own vehicle position estimation unit 17 and the autonomous driving control unit 18. The own vehicle position estimation unit 17 estimates the own vehicle position by collating a detection result of a road marking by the lidar 2 with the map DB 10. The autonomous driving control unit 18 acquires, from the map DB 10, the road marking information including the detection accuracy information Idet indicative of an accuracy of the collation with respect to each road marking. On the basis of the detection accuracy information Idet, the autonomous driving control unit 18 outputs, to an electronic control device or the information output unit 16 of the vehicle, information for controlling the vehicle so that the accuracy of the collation is equal to or larger than a predetermined value. According to this mode, the onboard device 1 can suitably increase the accuracy of the own vehicle position estimation.

MODIFICATIONS

Modifications suitable for the above embodiment will be described below. The following modifications may be applied to the embodiments in combination.

First Modification

Instead of the onboard device 1 storing the map DB 10 on the storage unit 12, a server device not shown may include the map DB 10. In this case, the onboard device 1 acquires necessary road marking information and the like by communicating with the server device through a communication unit not shown.

Second Modification

The configuration of the driving support system illustrated in FIG. 1 is an example, and the configuration of the driving support system to which the present invention can be applied is not limited to such a configuration illustrated in FIG. 1. For example, instead of including the onboard device 1, the driving support system may let an electronic control device execute the processes to be executed by the own vehicle position estimation unit 17 and autonomous driving control unit 18 of the onboard device 1. In this case, for example, the map DB 10 is stored on the storage unit in the vehicle and the electronic control device of the vehicle may receive the update information regarding the map DB 10 from a server device not shown.

BRIEF DESCRIPTION OF REFERENCE NUMBERS

1 Onboard device
2 Lidar

3 Gyro sensor
4 Vehicle speed sensor
5 GPS receiver
10 Map DB

The invention claimed is:

1. An output device comprising:
a sensor configured to detect an object by emitting a light and receiving the light reflected by the object;
a memory configured to store a program; and
a processor coupled to the sensor and the memory and configured to execute the program to:
receive a detection result from the sensor detecting the object by receiving the light reflected by the object;
estimate a position of a moving body based on a position of a road marking based on the detection result by the sensor and the position of the road marking according to map information;
acquire suitability information of a plurality of other road markings, the suitability information including a degree of suitability of each of the other road markings as a reference for moving body position estimation in at least one of a lateral direction and a travelling direction of the moving body; and
autonomously driving the moving body by:
automatically determining, based on the estimated position of the moving body, that detection accuracy of the road marking is lower than a predetermined value; and
automatically modifying a target track of the moving body based on the determination, wherein the modifying of the target track comprises, when there are multiple other road markings having a degree of suitability larger than a suitability threshold, identifying a second road marking having a highest degree of suitability of the multiple other road markings, and correcting the target track to include changing lanes to a lane where the second road marking is provided,
wherein the detection accuracy of the road marking indicates positional accuracy of the moving body when the position of the moving body is estimated based on the road marking.

2. The output device according to claim 1, wherein the processor is further configured to execute the program to:
identify, from one or more road markings provided at a route of the moving body, a low accuracy road marking for which the detection accuracy is lower than the predetermined value; and
output control information to further control the moving body so that the moving body gets away from the low accuracy road marking.

3. The output device according to claim 1, wherein the processor is further configured to execute the program to:
identify, from one or more road markings provided on a route of the moving body, a high accuracy road marking for which the detection accuracy is equal to or higher than the predetermined value; and
output control information to further control the moving body such that the moving body approaches the high accuracy road marking.

4. The output device according to claim 3, wherein the processor is further configured to execute the program to:
detect, by comparing errors of the estimated position of the moving body in a first direction and in a second direction with respect to a travelling direction of the moving body with an error threshold, a direction in which the error of the estimated position of the moving body is larger than the error threshold;
wherein the suitability information further indicates the degree of suitability of each of the plurality of other road markings in a case that each of the plurality of other road markings is used as a reference of position estimation in the detected direction; and
identify the high accuracy road marking based on the suitability information.

5. The output device according to claim 1, wherein, on a basis of an accuracy of the estimated position of the moving body, the processor is configured to execute the program to determine whether or not it is necessary to control the moving body such that the moving body gets away from a road marking for which the detection accuracy is lower than the predetermined value.

6. The output device according to claim 1, wherein, in a case that the road marking for which the detection accuracy is lower than the predetermined value exists within a detection range of the sensor, the processor is configured to execute the program to provide a weight based on a collation of a sensed marking and map data to be used to estimate position.

7. The output device according to claim 1, wherein the processor is further configured to execute the program to acquire accuracy information indicating the detection accuracy of the road marking, the accuracy information being included in the map information and including positional accuracy for the road marking at a previous time of road marking detection.

8. The output device according to claim 7, wherein a road marking for which the detection accuracy according to the accuracy information is lower than the predetermined value is a compartment line expressed by a plurality of lines.

9. The output device according to claim 7, wherein a road marking for which the detection accuracy according to the accuracy information is lower than the predetermined value is a faded road marking.

10. A control method executed by an output device comprising:
receiving a detection result from a sensor, the sensor detecting an object by emitting a light and receiving the light reflected by the object;
estimating a position of a moving body based on a position of a road marking based on the detection result by the sensor and the position of the road marking according to map information;
acquiring suitability information of a plurality of other road markings, the suitability information including a degree of suitability of each of the other road markings as a reference for moving body position estimation in at least one of a lateral direction and a travelling direction of the moving body;
and applying an autonomous driving of the moving body by:
automatically determining, based on the estimated position of the moving body, that detection accuracy of the road marking is lower than a predetermined value; and
automatically modifying a target track of the moving body based on the determination, wherein the modifying of the target track comprises, when there are multiple other road markings having a degree of suitability larger than a suitability threshold, identifying a second road marking having a highest degree of suitability of the multiple other road markings, and correcting the target track to include changing lanes to a lane where the second road marking is provided, wherein the detection accuracy of the road marking indicates positional accuracy of the moving body when the position of the moving body is estimated based on the road marking.

11. A non-transitory computer readable storage medium including instructions executed by a computer, the instructions causing the computer to perform functions comprising:
receiving a detection result from a sensor, the sensor detecting an object by emitting a light and receiving the light reflected by the object;
estimating a position of a moving body based on a position of a road marking based on the detection result by the sensor and the position of the road marking according to map information;
acquiring suitability information of a plurality of other road markings, the suitability information including a degree of suitability of each of the other road markings as a reference for moving body position estimation in at least one of a lateral direction and a travelling direction of the moving body;
and applying an autonomous driving of the moving body by:
automatically determining, based on the estimated position of the moving body, that detection accuracy of the road marking is smaller than a predetermined value; and
automatically modifying a target track of the moving body based on the determination, wherein the modifying of the target track comprises, when there are multiple other road markings having a degree of suitability larger than a suitability threshold, identifying a second road marking having a highest degree of suitability of the multiple other road markings, and correcting the target track to include changing lanes to a lane where the second road marking is provided,
wherein the detection accuracy of the road marking indicates positional accuracy of the moving body when the position of the moving body is estimated based on the road marking.

* * * * *